Jan. 9, 1968 V. J. NICOLETTI 3,363,169
GYROSCOPE NULL VOLTAGE CIRCUIT
Filed Oct. 15, 1964 2 Sheets-Sheet 1

INVENTOR.
VINCENT J. NICOLETTI
BY
Davis, Hoxie, Faithfull & Hapgood
ATTORNEYS.

United States Patent Office 3,363,169
Patented Jan. 9, 1968

3,363,169
GYROSCOPE NULL VOLTAGE CIRCUIT
Vincent J. Nicoletti, Spring Valley, N.Y., assignor to The United States Time Corporation, Waterbury, Conn., a corporation of Connecticut
Filed Oct. 15, 1964, Ser. No. 404,127
4 Claims. (Cl. 323—44)

ABSTRACT OF THE DISCLOSURE

A gyroscope includes a rotating rotor and a movable gimbal. The gyroscope includes a pickoff system, having primary and secondary windings, which provides a voltage indication of the position of the gimbal. Changes in temperature may cause the pickoff system to produce a voltage when the gimbal is at its null position. A circuit is provided for the secondary winding system to compensate for temperature variations and provide a zero voltage output at the null position of the gimbal. The circuit includes a linear temperature compensating element, particularly a resistor, connected in series with the secondary windings; a non-temperature responsive element also connected in series with the secondary winding; and means, particularly another winding, to create a constant voltage across the two elements.

---

The present invention is directed to gyroscopes and more particularly to means for compensating for variations in the null output signals of their electromagnetic pickoff systems caused by changes in temperature.

Microsyn electromagnetic pickoff systems, such as pickoffs of the rotary inductive type used in gyroscopes and accelerometers, having a primary winding system and a secondary winding system. Each winding system comprises a series of windings wound on magnetic poles. The primary and secondary winding systems are magnetically coupled to each other.

The pickoff is designed to produce a zero voltage output signal from the secondary winding system at the null position of the rotary element. This null position signal is obtained by connecting the series of windings in the secondary winding system in a particular phase relationship to each other so that the voltages induced in said secondary windings balance each other out. Unfortunately, this theoretical design feature is unattainable over the designed operating temperature range of the instrument. Temperature variations cause physical shifts within the pickoff (i.e., differential thermal expansion of the microsyn elements) and, when the rotary element of the pickoff is at its null position (i.e., is not being acted on by the external forces which it is designed to measure), an undesired output is produced by the secondary winding system. The null output signal of the pickoff is not at zero for all temperatures, as it should be, but is an undesirable signal which increases, as the temperature increases, in one phase direction or the opposite phase direction to produce inaccurate indications of whatever parameters the instrument including the pickoff is designed to measure.

It is the primary object of the present invention to provide simple compensating means for overcoming null output signal variations with temperature in an electromagnetic device, thereby rendering the null output signal substantially independent of temperature.

It is another object of the present invention to provide simple compensating means for overcoming null output signal variations with temperature in an electromagnetic device, which simple means are isolated from, and unaffected by, the output signal variations from the secondary winding system.

It is also an object of the present invention that said simple compensating means do not form a direct electrical link between the primary and secondary winding systems of the electromagnetic device.

A still further object of the present invention is to provide means for returning the temperature compensated null output signals to zero at any given temperature.

The present invention is made possible by the fact that the physical and magnetic shifts in an electromagnetic pickoff during temperature changes are found to repeat in the same manner and are therefore predictable in any given device, although these shifts may occur differently and cause widely varying results from one pickoff to another. These shifts result in null output signal variations from the secondary winding system of the pickoff, which signal variations in any given instrument are found to increase in a manner approximating linearity with increases in temperature within the operating temperature range of the instrument. The secondary winding system of the pickoff here being considered is wound so as to be able to produce output signals in either of two phase directions, depending on the direction of rotation of the rotary element of the instrument containing the pickoff, and the null output signals in a given instrument may be increasing in one or the other of said phase directions with temperature increases.

The present invention provides for a circuit compensating for said null voltage output variations with temperature, which circuit is energized by a voltage source insensitive to output signal variations and derived so as not to form a direct electrical link between the primary and secondary winding systems of the electromagnetic device. This circuit includes in series with the voltage source a temperature sensitive element and an element insensitive to temperature. The temperature sensitive element is of the type whose resistance increases linearly or in a manner approximating linearity with temperature. The temperature sensitive element is connected in series with the secondary winding system of the pickoff, and is small in resistance compared to the circuit element insensitive to temperature so that the voltage across the temperature sensitive element increases substantially linearly with temperature. This voltage is in series with the voltage of the secondary winding system which also increases in a manner approximating linearity with temperature, but the voltage source of the compensating circuit is established with a phase such that the voltage across the temperature sensitive element increases with temperature in an opposite phase direction from the phase direction that the voltage from the secondary winding system increases in with temperature. The compensating circuit element insensitive to temperature is set in value so that the two voltages subject to temperature variations will vary at the same rate, and the voltage change with temperature in one phase direction across the temperature sensitive element therefore balances out the voltage change in temperature in the other phase direction across the secondary winding system. The null voltage output from the pickoff across the series connection of the secondary winding system and the temperature sensitive element is then substantially independent of temperature. This compensated null voltage output should ideally be zero within the operating temperature range of the electromagnetic instrument, when the rotary element is not being acted upon by external forces which it is designed to measure, but it may be very difficult as a practical matter to design a compensating circuit for a given pickoff to achieve a compensated null output exactly equal to zero. In such instances, mechanical zeroing means or zeroing electrical circuits may further be used to reduce the compensated null voltage output to zero. Such a further zeroing circuit is also energized by a voltage source insensitive to output voltage variations from the secondary winding system, and includes two circuit elements insensitive to temperature connected in series across said voltage source. One of said circuit elements is generally small in resistance value in relation to the other circuit element, and is connected in series with the secondary winding system and the circuit element insensitive to temperature in the compensating circuit. Due to the difference in resistance values of these circuit elements, most of the voltage energizing the zeroing circuit is placed across the larger dropping resistance element, and the small value of zeroing voltage is placed across the smaller resistance. The resistance values of the two circuit elements are so chosen that only a voltage equal to the compensated null voltage is established across the smaller resistance element. The voltage source of the zeroing circuit is established with a phase so that the voltage across the smaller resistance element of the zeroing circuit is opposite in phase to the temperature compensated null voltage across both the secondary winding system and the temperature sensitive element of the compensating circuit connected in series with the secondary winding system. The null voltage output from the pickoff system across the series connection of the secondary winding system, the temperature sensitive element in the compensating circuit and the smaller resistance element in the zeroing circuit, is then substantially equal to zero.

Other objects and the full nature of the present invention will be readily understood and appreciated from the following description, taken in conjunction with the accompanying drawings, wherein.

Figure 1:
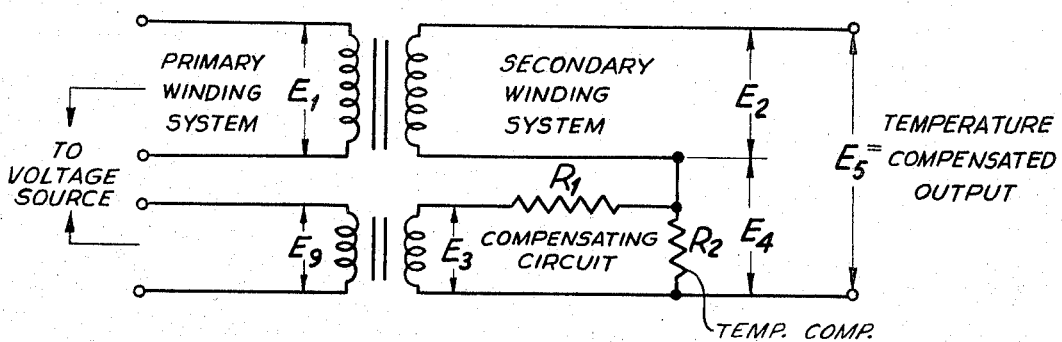
FIGURE 1 is a schematic circuit diagram of the primary and secondary winding systems of an electromagnetic pickoff and further illustrates the compensating circuit of the present invention.

Referring to FIGURE 1, two winding coils are shown to schematically depict the primary and secondary winding systems of the pickoff, with $E_1$ designating the constant voltage across the primary winding system and $E_2$ designating the uncompensated null output voltage across the secondary winding system. The primary winding system is actually a series of primary windings wound on a number of magnetic poles and connected across an alternating current voltage source to produce the constant voltage $E_1$. The secondary winding system is also a series of secondary windings wound on magnetic poles and magnetically coupled to the primary winding system. In the normal operation of the pickoff system, this magnetic coupling varies as the rotary element of the instrument containing the pickoff rotates, and pickoff output signals are produced by the secondary winding system in either of two phase directions depending on the direction of rotation of the rotary element. The individual secondary windings are wound on the magnetic poles such that the voltages induced therein from the primary windings should cancel each other out and produce zero output voltage from the secondary winding system when the rotary element of the pickoff is in its null position, but as stated above, temperature variations produce a null voltage $E_2$ increasing linearly with increases in temperature in either of the two possible phase directions.

To compensate for the variations of null voltage $E_2$, a compensating circuit as shown in FIGURE 1 is connected into the secondary winding system. The circuit includes a voltage source producing constant voltage $E_3$ which is insensitive to output signal variations, and resistances $R_1$ and $R_2$ connected in series with the constant voltage source $E_3$. Resistance $R_1$ is constant in resistance value over the operating temperature range of the pickoff, but resistance $R_2$ is temperature sensitive to increase linearly in resistance value as the temperature of the pickoff system increases. $R_2$ is also placed in series with the secondary winding system of the pickoff.

The compensating circuit is designed to produce across resistance $R_2$ a voltage $E_4$ which also increases linearly as temperature increases, at the same rate as the null output voltage $E_2$ increases as temperature increases, and in the opposite phase direction from that which the null voltage $E_2$ increases. To make the voltage $E_4$ across $R_2$ increase linearly with temperature, $R_2$ must be quite small in relation to $R_1$. Then, since voltage $$E_4 = \text{voltage } E_3 \times \frac{R_2}{R_1 + R_2}$$

and $E_3$ is constant, resistance $R_2$ is small compared to resistance $R_1$, and resistance $R_2$ increases linearly as temperature increases, compensating voltage $E_4$ will increase substantially linearly as the temperature of the pickoff system increases. With a pre-selected value of $R_2$, the rate at which voltage $E_4$ increases as temperature increases is determined by the resistance value of resistance $R_1$, and this is selected so the voltage $E_4$ has the same rate of change with temperature as null voltage $E_2$. Finally, the phase direction in which compensating voltage $E_4$ increases with temperature must be opposite to the phase direction in which null voltage $E_2$ increases with temperature. This phase direction in which voltage $E_2$ is increasing may be different from one instrument to another, but is easily determined in any given instrument. Compensating voltage $E_4$ is then made to increase in the opposite phase direction by establishing the proper phase on constant voltage $E_3$. In FIGURE 1, constant voltage $E_3$ is produced by a secondary winding of a transformer whose primary winding producing constant voltage $E_9$ is connected to the same voltage source which energizes the primary winding system of the pickoff. The voltages $E_3$ and $E_4$ are then either the same in phase or opposite in phase to the phase of the null output voltage $E_2$ at a given temperature. The desired phase of constant voltage $E_3$ to produce compensating voltage $E_4$ increasing in the the desired phase direction is achieved by connecting the series connection of resistances $R_1$ and $R_2$ across the secondary winding in one of the two possible ways it may be connected. Voltage $E_3$ is constant as it is not subject to the temperature induced physical shifts which influence $E_2$. Alternatively, constant voltage $E_3$ may be produced by an auxiliary winding having equal sections wound on the same magnetic poles as the primary windings of the primary winding system are wound. To produce the constant voltage, the voltage induced in all of the equal sections of the auxiliary winding must of course be in phase with each other rather than of opposing phases to balance out as in the case of the secondary windings of the secondary winding system, and the desired phase of the constant voltage $E_3$ is again achieved by connecting the series connection of resistances $R_1$ and $R_2$ across the auxiliary winding in one of the two possible ways it may be connected to thereby produce compensating voltage $E_4$ increasing in the desired phase direction. Whichever way voltage $E_3$ is produced, it is insensitive to the variations of voltage $E_2$ and is therefore constant. It will also be noted that voltage $E_3$ is produced so as not to form a direct electrical link between the primary and secondary winding systems of the electromagnetic device. The advantage of this is that any grounding of the secondary winding system will not ground the primary winding system. The voltage $E_5$ in FIGURE 1 represents the temperature compensated null output voltage of the pickoff system across the series connection of the secondary winding system and resistance $R_2$. This voltage $E_5$, by virtue of voltages $E_2$ and $E_4$ increasing as temperature increases at the same rate but in opposite phase directions, is a substantially constant voltage independent of temperature variations in the pickoff system.

Figure 2:
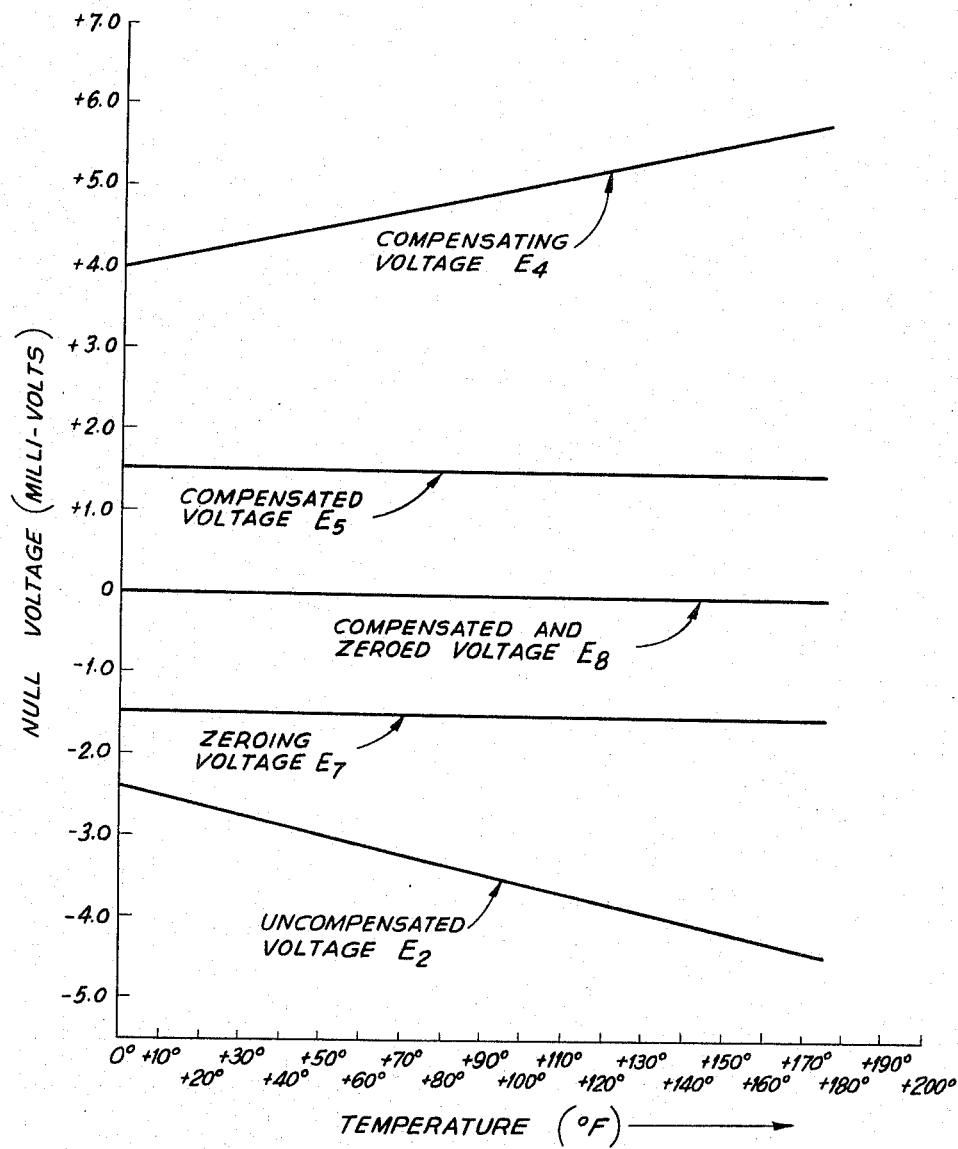
FIGURE 2 is a graph by way of example of both uncompensated and compensated null voltage signal variations with temperature.

Referring to FIGURE 2, a graph is shown by way of example to illustrate the manner in which the compensating circuit of FIGURE 1 operates to overcome null output signal variations with temperature from the secondary winding system. As descirbed above, the uncompensated null voltage $E_2$ from the secondary winding system in one phase direction (negative) is shown to be increasing approximately linearly as temperature increases. The compensating voltage $E_4$ across the temperature sensitive resistance $R_2$ is shown to be increasing linearly in the opposite (position) phase direction as temperature increases, and the rate of change with temperature of the two voltages $E_2$ and $E_4$ is the same. The resultant compensated pickoff null voltage $E_5$ across the series connection of the secondary winding system and resistance $R_2$ is therefore shown to be independent of temperature. Depending on the particular pickoff system being considered, the uncompensated null voltage $E_2$ might be increasing in either phase direction, and compensating voltage $E_4$ will always be phased to increase in the opposite phase direction. In actual practice, the rates of change with temperature of the compensating voltage $E_4$ and the uncompensated null voltage $E_2$ only approximate linear relationships, so that the resultant compensated voltage $E_5$ to that extent approximates being independent of temperature. In an example test performed on a typical rate gyroscope microsyn pickoff, wherein the uncompensated null voltage $E_2$ increased 2.4 millivolts in a substantially linear manner over an operating temperature range from 0–180° F., resistance $R_1$ was set at a resistance value of 7600 ohms and temperature sensitive resistance $R_2$ was set at a resistance value of 100 ohms at 75° F., the temperature compensated null output voltage $E_5$ was found to vary between extreme limits by only .4 millivolt. The compensated null output signal $E_5$ in the example test therefore varied within the operating temperature range less than seventeen percent of the amount that the uncompensated null output signal $E_2$ varied. The degree of compensation in any given pickoff system depends on the linearity of the uncompensated null voltage $E_2$ (substantially linear in all pickoff systems), the relationship of resistance values of resistances $R_1$ and $R_2$ which determine the linearity of compensating voltage $E_4$, the proper selection of resistance $R_1$ which determines the rate of change with temperature of compensating voltage $E_4$, and of course the proper phasing of the voltages $E_2$ and $E_4$, all as previously described. If desired, resistances $R_1$ and/or $R_2$ and or an additional element in the compensating circuit may vary in resistance in a manner only approximating a linear variation with temperature, so that the compensating circuit will provide a voltage $E_4$ which more exactly duplicates the rate of change of voltage $E_2$ with temperature. This use of linear circuit elements in the compensating circuit will usually provide adequate compensation, however.

Figure 3:
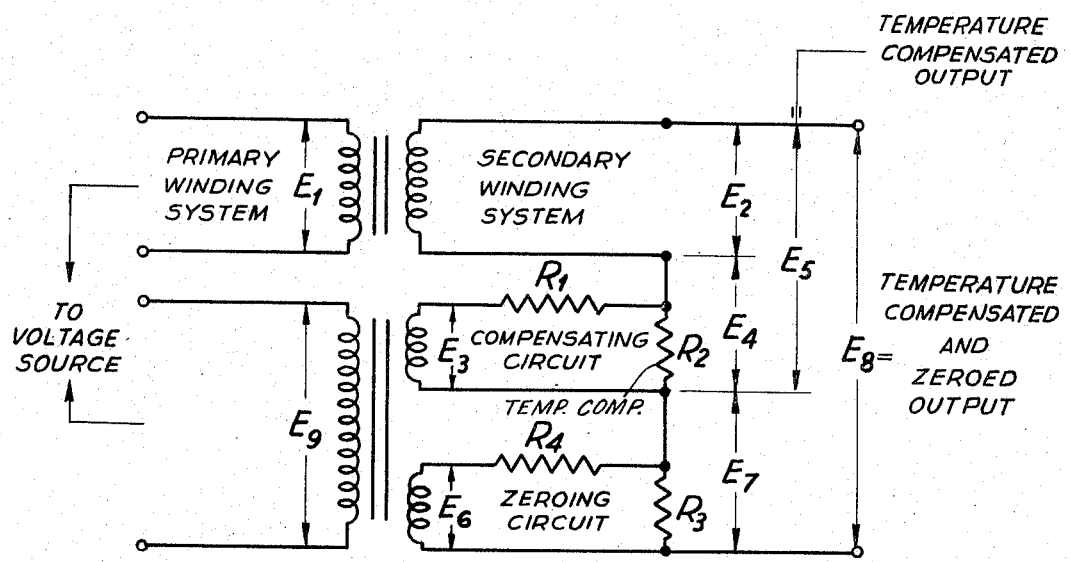
FIGURE 3 is a schematic circuit diagram of the primary and secondary winding systems of an electromagnetic pickoff, and further illustrates both the compensating circuit and zeroing circuit of the present invention.

The compensated null output signal $E_5$, as shown in FIGURES 1, 2 and 3, is generally established at a voltage level not equal to zero and of either of the two opposite phases. It is very difficult to set voltage $E_5$ at zero throughout the temperature operating range solely by the use of the compensating circuit of FIGURE 1, since to do this requires that several relationships between resistances $R_1$ and $R_2$ be very accurately determined. Namely, resistance $R_2$ must be small in relation to resistance $R_1$ so that compensating voltage $E_4$ is substantially linear, resistance $R_1$ must be set in value for a resistance $R_2$ varying at a particular rate so that compensating voltage $E_4$ across resistance $R_2$ has the correct rate of change with temperature, and the ratio of the two resistances must be varied in an exact manner over the operating temperature range so that voltage $E_3$ is divided to place the correct compensating voltage $E_4$ across resistance $R_2$ to balance out uncompensated voltage $E_2$ over the temperature range and render compensated voltage $E_5$ equal to zero. The problem becomes acute since the resistance $R_1$ required to provide the correct rate of change of voltage $E_4$ for a resistance $R_2$ varying at a particular rate is usually not in the correct ratio to resistance $R_2$ to render compensated voltage $E_5$ equal to zero. Only in very rare instances will all of these required relationships be achievable by the compensating circuit in a given pickoff system to provide a temperature compensated null output voltage $E_5$ equal to zero.

A simple solution to the problem of zeroing is to use conventional mechanical zeroing means or to use a zeroing circuit such as illustrated in FIGURE 3. FIGURE 3 is the same schematic diagram as FIGURE 1 with the addition of a zeroing circuit connected to the series connection of the secondary winding system and resistance $R_2$. The zeroing circuit of FIGURE 3 includes a constant voltage source producing voltage $E_6$, and resistances $R_3$ and $R_4$ which are not subject to changes in resistance as temperature varies. Resistances $R_3$ and $R_4$ are connected in series across voltage $E_6$, and resistance $R_3$ is further connected in series with resistance $R_2$ of the compensating circuit and the secondary winding system. A constant zeroing voltage $E_7$ is produced across resistance $R_3$ and must be of the correct numerical value and phase to balance out the substantially constant compensated voltage $E_5$, whereby the pickoff null output voltage $E_8$ across the series connection of the secondary winding system, resistance $R_2$ and resistance $R_3$ is substantially equal to zero for any temperature within the temperature operating range when no external forces are acting on the rotary element of the instrument containing the pickoff. For any given constant voltage $E_6$, zeroing voltage $$E_7 = E_6 \times \frac{R_3}{R_4 + R_3}$$

Since resistances $R_4$ and $R_3$ are constant in value, they are easily selected to provide the correct value of zeroing voltage $E_7$. Voltage $E_7$ is generally very small, in the range of a millivolt or less, and voltage $E_6$ will generally be much larger, so that resistance $R_4$ serves as a voltage dropping resistance and is larger in value compared to resistance $R_3$.

Voltage source $E_6$ should also be insensitive to output signal variations from the secondary winding system in the same manner as voltage source $E_3$. Voltage source $E_6$ may be derived in several ways. As shown in FIGURE 3, it may be provided by a second secondary winding on the same transformer that provides voltage $E_3$ for the compensating circuit. The primary winding of this transformer, as stated above, is connected to the same voltage source that energizes the primary winding system of the pickoff. Alternately, voltage source $E_6$ may be established by an auxiliary winding wound on the same magnetic poles that the primary winding system of the pickoff is wound on, in the manner described above relating to voltage source $E_3$ in the compensating circuit being provided by such an auxiliary winding. In either case, voltage $E_6$ is also produced so as not to form a direct electrical link between the primary and secondary winding systems of the electromagnetic device. The phase of zeroing voltage $E_7$ must also be opposite in phase to compensated voltage $E_5$ in order that the null output voltage $E_8$ will equal zero over the operating temperature range of the pickoff. The phase of compensated voltage $E_5$ is easily determined, and the winding providing voltage $E_6$ is then wound to make voltage $E_7$ opposite in phase to voltage $E_5$. The phases of voltages $E_5$ and $E_7$ are shown in the graph of FIGURE 2, and being equal in numerical value and opposite in phase, balance each other out so that the pickoff null voltage $E_8$ equals zero over the operating temperature range.

It will be apparent to those of ordinary skill in the art to which this invention pertains that changes and modifications may be made from the invention as described

I claim:

1. In an electromagnetic pickoff system including a primary winding system connected to a voltage source, and a secondary winding system magnetically coupled to the primary winding system and producing a voltage output signal which varies in either of two opposite phase directions as the magnetic coupling between the primary winding system and secondary winding system varies, a circuit compensating for null voltage output signal variations with temperature from the secondary winding system; said circuit comprising a power source producing a constant voltage signal insensitive to null voltage output variations, a first resistance independent of temperature connected in series with said power source, and a second resistance varying substantially linearly with temperature connected in series with said first resistance and said power source; said second resistance also being connected in series with said secondary winding system; said second resistance being small in value in relation to said first resistance so that the voltage across said second resistance increases substantially linearly with temperature increases; the phase of said power source being such that the voltage across said second resistance increases with temperature in the opposite phase direction from the increase in null voltage with temperature across the secondary winding system; and, said first resistance being of a value such that the rate of increase of the voltage signal with temperature in one phase direction across said second resistance is the same as the rate of increase of the null voltage signal with temperature in the opposite phase direction across said secondary winding system; whereby, the null voltage across the series connection of said resistance and said secondary winding system is substantially independent of temperature.

2. The invention as defined in claim 1, wherein said power source is a winding of a transformer external to the electromagnetic pickoff system, said winding having a constant voltage induced therein by another winding of the transformer energized by the voltage source energizing said primary winding system.

3. The invention as defined in claim 1, wherein said power source is an auxiliary winding wound in equal sections on the same magnetic poles as the primary winding system in a phase relation to have a constant voltage induced in said auxiliary winding by said primary winding system.

4. An electromagnetic pickoff system comprising in combination a primary winding system connected to a voltage source, a secondary winding system magnetically coupled to the primary winding system and producing a voltage output signal which varies as the magnetic coupling between the primary winding system and secondary winding system varies, circuit means a portion of which is connected in series with said secondary winding system, said circuit means including a temperature responsive element to compensate for null voltage output signal variations with temperature from the secondary winding system, the series connection of said portion of said circuit means and said secondary winding system producing a null voltage signal substantially independent of temperature, and means for reducing said compensated null voltage to zero, wherein said means for reducing said compensated null voltage to zero comprises a power source producing a constant voltage signal insensitive to null voltage output variations and two resistances independent of temperature connected in series across said power source; one of said resistances also being connected in series with said secondary winding system and said portion of said compensating circuit means; said resistance in series with said secondary winding system and said portion of said compensating circuit means being of a value such that the voltage produced across it by said power source is equal to the temperature compensated null voltage; and, said power source producing said constant voltage signal across said series of resistances being of a phase opposite to the phase of the compensated null voltage output signal; whereby the null voltage across the series connection of said secondary winding system, said portion of said compensating means and said resistance is equal to zero.

References Cited

UNITED STATES PATENTS

| | | | |
|---|---|---|---|
| 2,700,829 | 2/1955 | Statsinger | 74—5.6 X |
| 2,882,484 | 4/1959 | Swainson | 323—113 X |
| 2,922,146 | 1/1960 | Smith et al. | 340—199 |
| 3,041,527 | 6/1962 | Cook | 323—61 X |
| 3,143,700 | 8/1964 | Cox | 323—126 |
| 3,225,289 | 12/1965 | Koppel et al. | 323—51 |

JOHN F. COUCH, *Primary Examiner.*

A. D. PELLINEN, *Assistant Examiner.*